Sept. 22, 1970

YUKIO YAMACHI ET AL 3,530,370

FLICKER PREVENTING CIRCUIT

Filed July 23, 1968

INVENTORS
YUKIO YAMACHI
SINYA TANAKA
TAKASHI KATO
BY

OSTROLENK, FABER, GERB & SOFFEN
ATTORNEYS

Sept. 22, 1970　　　YUKIO YAMACHI ET AL　　　3,530,370
FLICKER PREVENTING CIRCUIT
Filed July 23, 1968　　　　　　　　　　　　　　4 Sheets-Sheet 2

INVENTORS
YUKIO YAMACHI
SINYA TANAKA
BY TAKASHI KATO
OSTROLENK, FABER, GERB & SOFFEN
ATTORNEYS

Sept. 22, 1970  YUKIO YAMACHI ET AL  3,530,370
FLICKER PREVENTING CIRCUIT

Filed July 23, 1968  4 Sheets-Sheet 3

INVENTORS
YUKIO YAMACHI
SINYA TANAKA
BY TAKASHI KATO

OSTROLENK, FABER, GERB & SOFFEN

ATTORNEYS

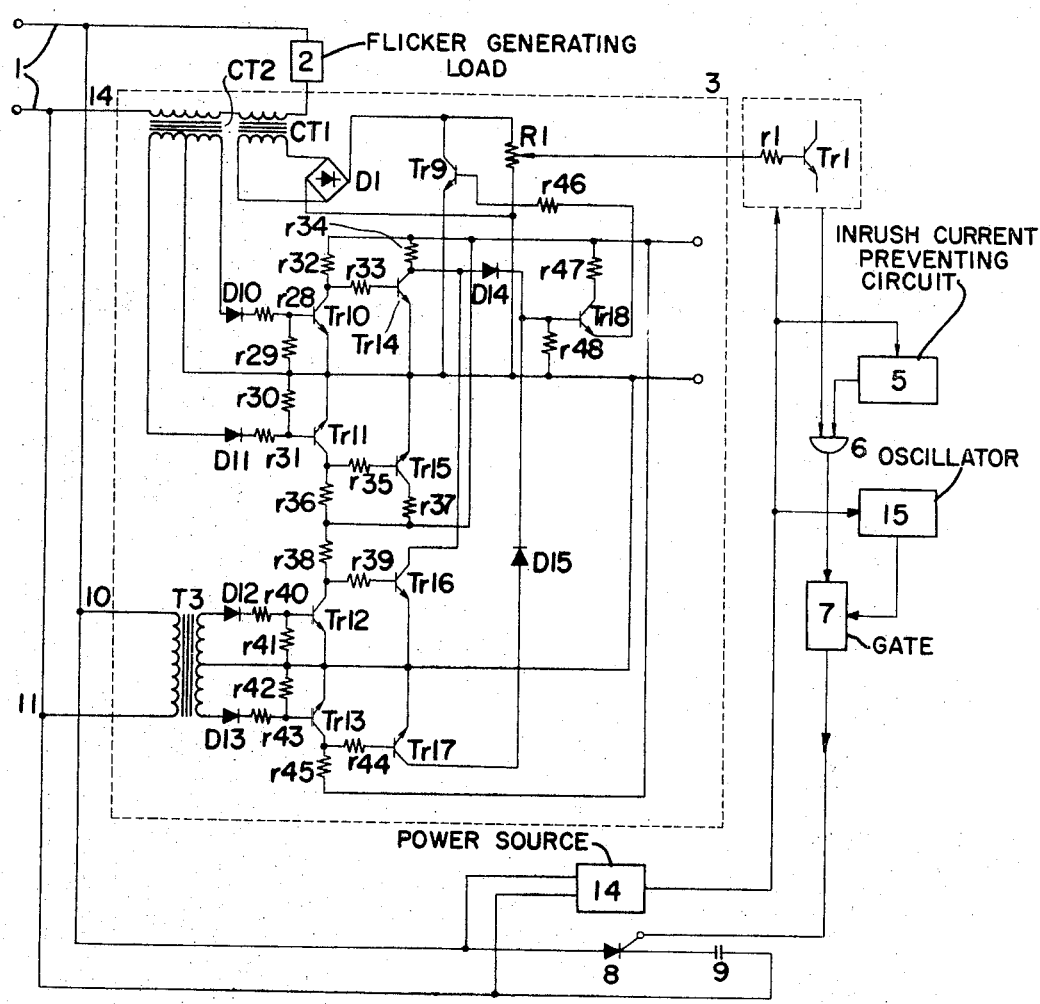

though its zero value so as to signficantly limit the amount of in-rush current flowing into the capacitors as they are switched into the power line circuit.

United States Patent Office 3,530,370
Patented Sept. 22, 1970

3,530,370
FLICKER PREVENTING CIRCUIT
Yukio Yamachi and Sinya Tanaka, Tokyo, and Takashi Kato, Adachi-gun, Japan, assignors to Sanken Electric Company, Limited, Adachi-gun, Japan
Filed July 23, 1968, Ser. No. 746,941
Claims priority, application Japan, Dec. 2, 1967, 42/77,092
Int. Cl. G05f 1/68
U.S. Cl. 323—106
4 Claims

ABSTRACT OF THE DISCLOSURE

A circuit for preventing flicker in a power line which utilizes a detection circuit for detecting variations in the power line signal and for generating a signal proportional to the amount of the variations. This output is compared against the previously existing level in the power line to determine the amount of correction required. One or more capacitors in a capacitor bank are selectively switched into the power line under the control of semiconductor switches in order to correct the power factor. Switching is further controlled so as to occur at a time when the current in the power line is passing substantially through its zero value so as to signficantly limit the amount of in-rush current flowing into the capacitors as they are switched into the power line circuit.

---

Figure 1:
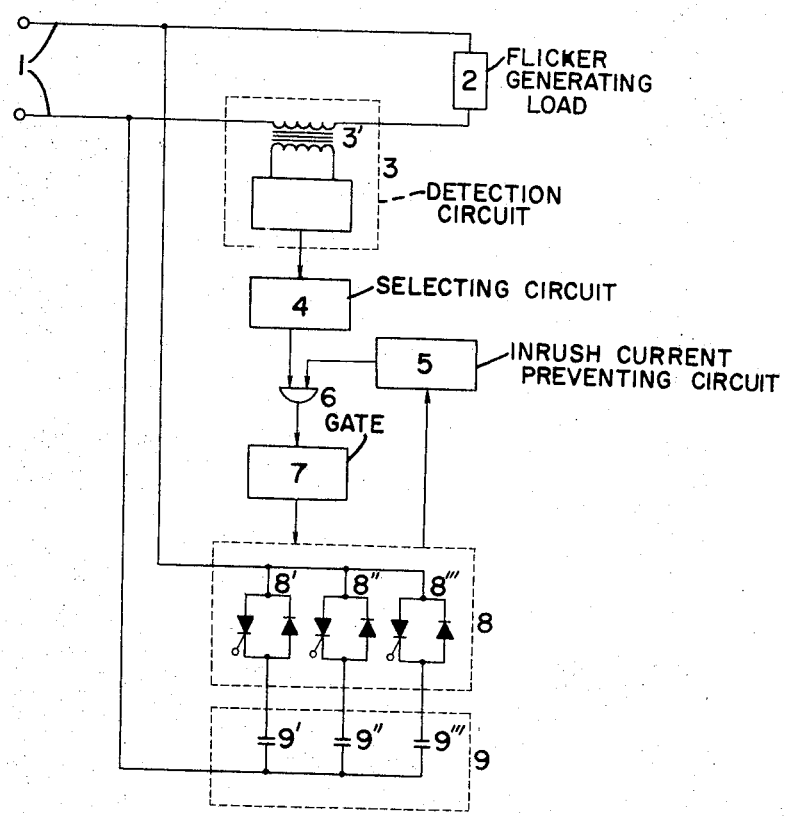

This invention relates to a flicker preventing circuit, and more particularly to a flicker preventing circuit of the type wherein the flicker is compensated by the capacitors which are connected into the circuit through a plurality of semiconductor switches operated in accordance with the amount of flicker present.

When an electric furnace, welder, or a large size electric motor is connected to an electric power line such as a transmission line or a distribution line, the presence of flicker becomes an important problem which may present a severe obstacle to various other electrical equipments connected to the same power line.

The direct reason for the occurrence of flicker is an abrupt change of the load current flowing in a flicker generating load as an electric furnace or a welder, and in most cases, the flicker causing current component $\Delta I_L$ is of the lagging power factor type. Assuming that the line resistance is R, the line reactance is X, and the phase angle of the current component $\Delta I_L$ is $\theta$, then the voltage drop $\Delta V$ in the line can be expressed as $$\Delta V \approx R\Delta I_L \cos \theta + X\Delta I_L \sin \theta$$

When this flicker is desired to be eliminated, the above described voltage drop must be decreased to zero. For this purpose, a leading electric current Ic as determined by the equation:

$$R\Delta I_L \cos \theta + X\Delta I_L \sin \theta = XI_C$$

namely, $$I_C = \frac{R\Delta I_L \cos \theta + X\Delta I_L \sin \theta}{X}$$

should be furnished to the power line.

However, it was impossible in the past to furnish such leading current each time the load current abruptly changes, and the conventional measures which have been employed to prevent flicker consist of enlarging the size of the power line or separating the flicker generating loads from other loads. These measures, however, required the adoption of unnecessarily large size power lines or an unwarranted additional cost for the provision of a separation technique.

Therefore, one object of the present invention is to provide a flicker preventing circuit by which the above described drawbacks are substantially eliminated and the power factor of the power line is also improved.

Another object of the present invention is to provide a flicker preventing circuit, wherein semiconductor switches are operated in response to the abrupt change of the load current thereby causing a plurality of capacitors to be successively and stepwisely connected with the power line so that a leading current corresponding to the variation of the load current is furnished to the power line, and the flicker caused by the variation of the load current is thereby compensated.

Still another object of the present invention is to provide an inrush current preventing circuit, and the inrush current created when the capacitors are connected to the power line is thereby eliminated.

A further object of the present invention is that, when the variation of the power factor is too large, the variation is detected through signals created from a current detecting circuit and from a voltage detecting circuit, and a suitable number of capacitors are thereby connected to the power line.

In accordance with the present invention, there is provided a flicker preventing circuit wherein the flicker is detected through a detecting circuit, the output signal from the detecting circuit is utilized for ON-OFF operation of the semiconductors switches connected in series with the capacitors, whereby the compensating capacitors are stepwisely connected to the power line and a leading current is furnished to the A.C. power line to compensate the lagging current cause by the flicker generative load.

When the compensating capacitors are connected to the power line, an inrush current usually flows into the capacitor. To prevent this inrush current, an inrush current preventing circuit is provided and the circuit is so arranged that when a signal from this inrush current preventing circuit and also a signal from the selecting circuit simultaneously enter an AND circuit, a signal is sent out to a gate circuit which in turn sends out a trigger signal to the semiconductor switching circuit, whereby the compensating capacitors are connected to the power line without causing the inrush current.

Likewise when the power factor of the power line at the time of the occurrence flicker is too great, the variation of the power factor is detected by sensing the line current and the load voltage, whereby the signals from both sensing devices are furnished to another AND circuit and an OR circuit, whereby the power factor variation is detected satisfactorily and a suitable number of capacitors are connected to the power line.

Figure 2A:
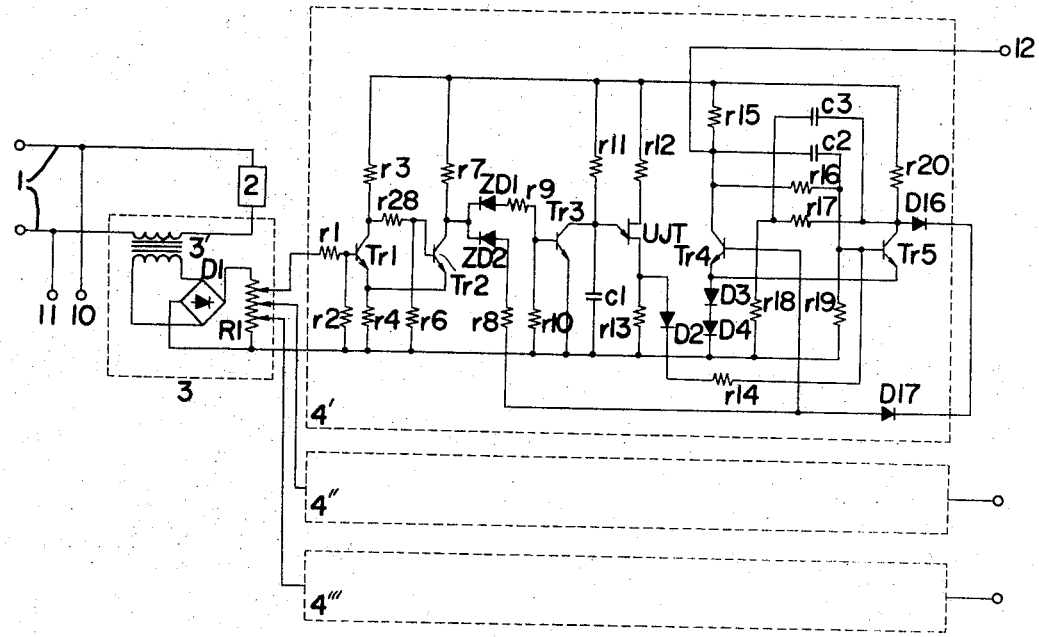
Figure 2B:
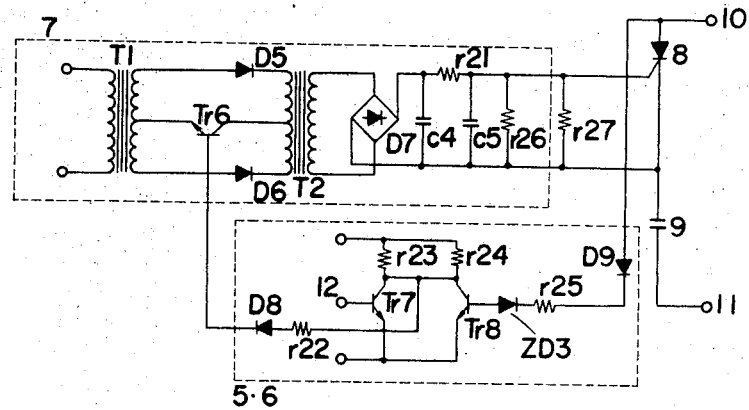
Figure 3:
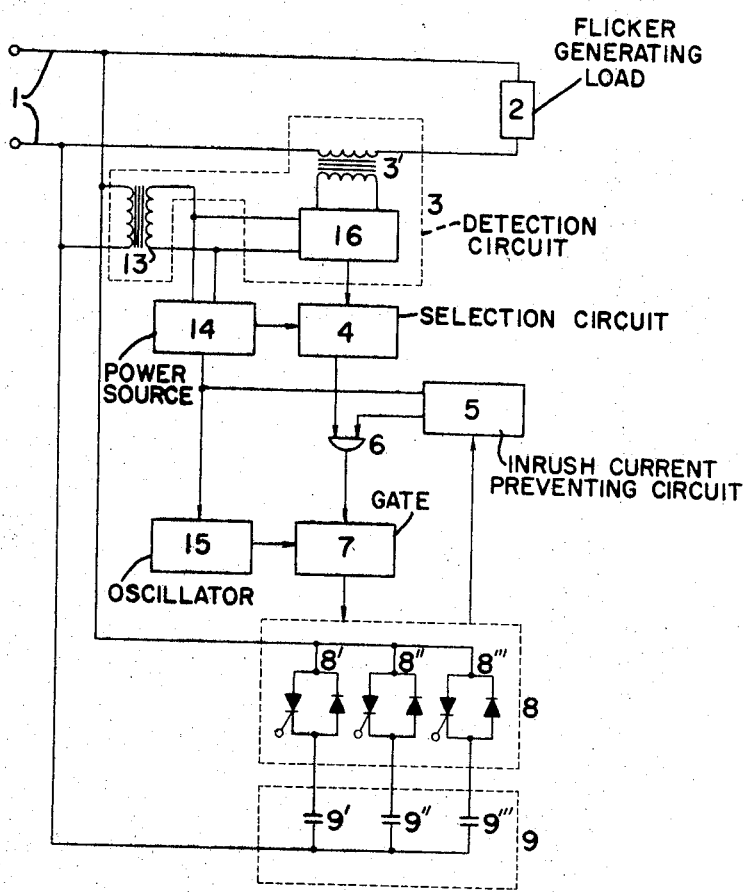

The invention will be made more apparent from the following description with respect to the preferred embodiments thereof when it is read in conjunction with the accompanying drawings, in which:

FIG. 1 is a block-diagram of an embodiment of the present invention,

FIGS. 2(a) and 2(b) are circuit diagrams illustrating portions of the embodiment of the present invention, FIG. 3 is a block-diagram of another embodiment of the present invention, and FIG. 4 is a practical circuit diagram of still another embodiment of the present invention.

In FIG. 1, there are indicated an A.C. power line 1, a flicker generating load 2, a detecting circuit 3, a selecting circuit 4, an inrush current preventing circuit 5, an AND circuit 6, a gate circuit 7, a semiconductor switching circuit 8, and a compensating capacitor assembly 9.

When a voltage fluctuation is caused by the flicker generating load 2, the current is detected by the detecting circuit 3, and the output is furnished to the selecting circuit 4. In the selecting circuit 4, the variation of the current is compared with a present value and a signal for determining the number of the compensating capacitors 9', 9'', 9''' is issued to the AND circuit. The inrush current preventing circuit 5 at the same time determines an instant, for instance, when the voltage across the semiconductor switches is zero and sends out a signal. When both of the signals arrive at the AND circuit 6 simultaneously, a signal is applied to the gate circuit 7 wherefrom the trigger signals are furnished to the required semiconductor switches 8', 8'', and 8'''. The conducted semiconductor switches 8', 8'', or 8''' then connect the compensating capacitors 9', 9'', or 9''' to the power line 1.

Referring now to FIG. 2 which illustrates circuit diagrams illustrating the same embodiment of the present invention, wherein the flicker generating load 2 is furnished power from the A.C. power line 1, the fluctuation of the current flowing through the load 2 is detected by a current transformer 3' included in the detecting circuit 3, the output thereof is rectified by a rectifier circuit D1 and picked up from a resistor R1 connected across the rectifier circuit. The resistor R1 is provided with a plurality of taps corresponding to the number of the capacitors 9', 9'', 9''' and their selecting circuits 4', 4'', 4'''. In the first selecting circuit 4', there are indicated transistors $Tr1$, $Tr2$, $Tr3$ . . . $Tr5$, resistors $r1$ to $r20$, capacitors $c1$ to $c3$, Zener diodes ZD1, ZD2, unijunction transistor UJT, and diodes D2, D3, D4, D16, D17. The transistors $Tr1$, $Tr2$ and the related resistors from a "Schmitt circuit" which determines if the voltage obtained from the resistor R1 is larger or smaller than a present voltage. When the transistor $Tr1$ conducts, the transistor $Tr2$ turns OFF, and a signal is sent through a Zener diode ZD2 to the base circuit of a transistor $Tr4$ which forms a flip-flop circuit together with transistor $Tr5$. The transistor $Tr3$ is also rendered conductive by a signal from the Zener diode ZD1 to stop the oscillation of a unijunction transistor UJT sending out a signal to turn OFF transistor $Tr4$ of the flip-flop circuit. The oscillation frequency of the UJT is so determined that the transistor $Tr4$ does not repeat ON-OFF operation at each half cycle of the oscillation frequency. Since the terminal voltage of the resistor R1 reaches the peak value and goes to its zero voltage once in every half cycle, the transistor $Tr1$ repeats ON-OFF operation during each half cycle of the power frequency, and this causes the transistor $Tr3$ to repeat the ON-OFF operation. If the repetition frequency of the UJT is shortened, the UJT might send out a pulse during the period when transistor $Tr3$ being turned OFF, and with this pulse transmitted through a diode D2 and a resistor $r14$ to the transistor $Tr5$, the transistor $Tr5$ might be turned ON and the transistor $Tr4$ be turned OFF. To prevent this a resistor $r11$ and a capacitor $c1$ are adjusted so that the transistor $Tr4$ is turned ON when the peak value of the terminal voltage across the resistor R1 exceeds a predetermined value.

When a signal from the selecting circuit 4' and a signal from the inrush current preventing circuit 5 are simultaneously furnished to the AND circuit 6, a signal is sent out to the gate circuit 7. In FIG. 2(b), the points 10 and 11 are connected with the points 10 and 11 of FIG. 2(a). In the drawing, there are indicated a semiconductor switch circuit 8, a compensating capacitor device 9, diodes D5, D6 . . . D9, a rectifier D7, transformers T1, T2, other transistors $Tr6$ to $Tr8$, resistors $r21$ to $r27$, capacitors $c4$, $c5$ and a Zener diode ZD3.

In the combined inrush current preventing circuit and AND circuit 5-6, the transistor $Tr7$ is kept in OFF state by a signal furnished from the selector circuit 4'. At the same time a transistor $Tr8$ is driven into the OFF state when the voltage between the anode and cathode of the semiconductor switch 8 is reduced to nearly zero, and a signal is sent out to the gate circuit 7 through a diode D8 and a resistor $r22$. The gate circuit 7 is so constructed that when a square wave A.C. voltage is applied to the input side of a transformer T1 and a signal from the AND circuit 6 is furnished to the base 13 of a transistor $Tr6$, a current flows through T1→D5→T2→$Tr6$ or T1→D6→T2→$Tr6$ and a voltage is applied at the input side of the transformer T2. The output from the transformer T2 is then converted into D.C. through a rectifier D7, and a trigger signal is furnished to the semiconductor switch 8, whereby selected ones of the compensating capacitors 9 are connected to the power line. In this case, the power sources for the selecting circuit, the inrush current protecting circuit, and the AND circuit may be taken from the same power line or from separate power lines. Furthermore, the electric power furnished to the gate circuit may be taken from an oscillator or the original A.C. power line itself.

FIGS. 3 and 4 illustrate another embodiment of the present invention, wherein the A.C. power line 1, the flicker generative load 2, the selecting circuit 4, the inrush current preventing circuit 5, and the AND circuit 6, the gate circuit 7, the semiconductor switch circuit 8, and the compensating capacitor circuit 9 are all indicated as in the case of the above described embodiment of FIG. 1. However in FIG. 3, there are shown a transformer 13, a commonly used power source 14, and a commonly used oscillator 15 in addition to the above described circuit components. When the variation of the power factor deviation at the time of flicker generation is large, the current value is detected by a detecting unit 3 having a current transformer 3', and the terminal voltage of the load is detected by a transformer 13, whereby the variation of the power factor is detected by a detecting circuit 16 and a signal is issued to the selecting circuit 4 which is supplied power from the power unit 14. The selecting circuit is thus operated and a signal is sent to the AND circuit 6, which, upon the simultaneous reception of a signal from the inrush current preventing circuit 5, furnishes another signal to the gate circuit 7. The gate circuit 7 receives a square wave A.C. power signal from the oscillation circuit 15 which is furnished power from the power source 14, and when the above described signal is received from the AND circuit 6, the gate circuit 7 operates and a trigger signal is sent to the semiconductor switch circuit 8.

FIG. 4 illustrates another embodiment which is almost similar to the embodiment of FIG. 3, but the detecting unit 3 in this embodiment has two current transformers CT1, CT2 which receive the load current, and a transformer T3 connected across the terminals of the load. The phase relation between the current transformers and the potential transformer is determined properly.

Assuming that the current is of lagging power factor and that terminal 13 of the transformer CT1 is positive, then a current will flow through the CT2, a diode D10, a resistor $r28$, to the base of a transistor $Tr10$, and the transistor $Tr10$ conducts. At this time, the terminal 10 of the transformer T3 is also positive and a signal is furnished through a diode D12, a resistor $r40$ to the base of a transistor $Tr12$, and the transistor $Tr12$ conducts. Then a signal obtained from the transistors $Tr10$ and $Tr12$ is furnished to one part of an AND circuit consisting of transistors $Tr14$ and $Tr16$. When the polarity of said terminal and the transformer is reversed, transistors $Tr11$, $Tr13$ conduct and another signal is sent to the other part of the AND circuit consisting of transistors $Tr15$, $Tr17$. The outputs from the part of the AND circuit consisting of the transistors $Tr14$, $Tr16$ and the other part of AND circuit consisting of the transistors $Tr15$, $Tr17$ are sent to an OR circuit consisting of diodes D14, D15, and the output from the OR circuit is coupled to the base of a transistor $Tr18$. The transistors $Tr18$ and $Tr9$ are thus caused to conduct during a part of the phase angle from $wt = \theta + n\pi$ to $wt = (n+1)\pi$, where $n = 1, 2 \ldots$ . As a result, the current flowing through the current transformer CT1 flows through the transistor $Tr9$ and the terminal voltage across a resistor R1 becomes zero.

However, during another part of the phase angle starting from $wt=(n+1)\pi$ to $wt=\theta(n+1)\pi$, the transistors Tr18, Tr19 do not conduct and the current through the secondary side of the transformer CT1 flows through the resistor R1. The peak value of the terminal voltage across the resistor R1 is $RI \sin \theta$, where $I \sin \theta$ corresponds to the reactive component of the current flowing through the flicker generating load. The voltage across the resistor R1 thereafter being detected and the peak value $R \cdot I \cdot \sin \theta$ of the reactive component of the flicker generative load current is determined by the selecting circuit. As is apparent from the foregoing description, the flicker current is first converted into a voltage, and the voltage thereafter operates the selecting circuit, causing a signal to be sent to the AND circuit 6. When another signal from the inrush current preventing circuit which determines the conducting time position of the semiconductor switches 8 is simultaneously received at the AND circuit 6 together with the signal from the selecting circuit, the AND circuit 6 sends out a signal to the gate circuit 7 which in turn furnishes a trigger signal to the gate of the semiconductor switches 8. The semiconductor switches 8 then operate and the compensating capacitors 9 are selectively connected to the power line. In this manner, even when the variation of the power factor is great, the flicker can be prevented by detecting the variation of the power factor.

As is described in connection with the several embodiments of the present invention, the flicker in a power line is detected by means of a detecting circuit, a selecting circuit determining the amount of the flicker, a gate circuit is operated to conduct the corresponding semiconductor switches, whereby the compensating capacitors are connected to the power line for preventing the flicker.

In this case, supposing that the compensating capacitors 9′, 9″, 9‴ in FIG. 1 are 10 kva., 20 kva., and 40 kva., respectively, the current of leading power factor which corresponds to the following kva. can be regulated by the ON–OFF operation of the semiconductor switches:

|  | Semiconductor | | |
|---|---|---|---|
|  | Switch 8′ | Switch 8″ | Switch 8‴ |
| Kva.: | | | |
| 0 | X | X | X |
| 10 | O | X | X |
| 20 | X | O | X |
| 30 | O | O | X |
| 40 | X | X | O |
| 50 | O | X | O |
| 60 | X | O | O |
| 70 | O | O | O |

Note.—The symbol "O" indicates conduction of the switches.

In conventional devices, when the capacitors are thrown into the power line, a considerable amount of inrush currents flows into each of the capacitors and this fact caused severe obstacles in such applications. In the present invention, the inrush current is prevented by the inrush current preventing circuit which determines a suitable time position for connecting these capacitors into the power line, for instance, as an instant when the voltage between the anode and cathode of the semiconductor switch is nearly zero, and a signal is issued to the AND circuit. When the AND circuit receives this signal and also a signal from the selecting circuit, it sends out a signal to conduct the semiconductor switches, and the inrush current is thereby utterly prevented.

When flicker occurs, if the phase angle of the load current is too large, the voltage and the current are both detected for adjusting the phase relation, and the detecting signal is sent to another AND circuit. The output of the AND circuit then enters an OR circuit for full determination of the electrical variation, and the compensating capacitors are connected to the power line to eliminate both flicker and the variation in power factor.

What is claimed is:

1. A flicker preventing circuit to be used in an A.C. power line connected with a flicker generating load, said circuit comprising at least one semiconductor switch, compensating capacitor being connected in series with said semiconductor switch, a detecting circuit for detecting electric variations on the power line, a selecting circuit receiving information from the detecting circuit for generating a signal proportional to the amount of electrical variation in the power line, an inrush current preventing circuit for determining the time position at which the samiconductor switch connects the compensating capacitor into the power line, an AND circuit for generating a signal when the output signal from the selecting circuit and the output signal from the inrush current preventing circuit are simultaneously received by said AND circuit, a gate circuit which receives the signal generated by said AND circuit and issues a trigger signal to the semiconductor switch, whereby the semiconductor switch conducts and connects the compensating capacitor to the power line, and the flicker is thereby eliminated.

2. A flicker preventing circuit to be used in an A.C. power line connected with a flicker generating load, said circuit comprising a plurality of semiconductor switches; a plurality of compensating capacitors each connected in series with one of said semiconductor switches; a detecting circuit which includes a current transformer for detecting current variation in said power line, rectifier means for rectifying the output of said current transformer, and a resistor connected across said rectifier means for developing an output voltage; a selecting circuit receiving said output voltage from the detecting circuit for generating a signal proportional to the amount of electrical variation on the power line, an inrush current preventing circuit for controlling the time at which the semiconductor switches are operated to prevent inrush current from flowing in the capacitors at the time when the semiconductor switches connect their associated compensating capacitors to the power line, an AND circuit for generating a signal when the output signal from the selecting circuit and the output signal from the inrush current preventing circuit are simultaneously received by said AND circuit, a gate circuit for receiving the output signal from the AND circuit to issue a trigger signal to the required number of the semiconductor switches, whereby the semiconductor switches conduct and connect the required number of the compensating capacitors to the power line, and the flicker is thereby eliminated.

3. A flicker preventing circuit to be used in an A.C. power line connected with a flicker generating load, said circuit comprising a plurality of semiconductor switches, a plurality of compensating capacitors each connected in series with one of said semiconductor switches, a detecting circuit for detecting electric variations in the power line through a voltage and a current sensing means, a selecting circuit for receiving information from the detecting circuit and generating a signal proportional to the amount of electrical variation on the power line, an inrush current preventing circuit for determining the time at which said semiconductor switches are operated to prevent the flow of inrush current when the semiconductor switches connect their compensating capacitor to the power line, an AND circuit for generating a signal when the output signal from the selecting circuit and the output signal from the inrush current preventing circuit are simultaneously received by said AND circuit, a gate circuit responsive to receive the signal generated by said AND circuit for applying a trigger signal to the required number of semiconductor switches, whereby the semiconductor switches conduct and connect the required number of the compensating capacitors to the power line, and the flicker is thereby eliminated.

4. A flicker preventing circuit to be used in an A.C. power line connected with a flicker generating load, said circuit comprising a plurality of semiconductor switches, a plurality of compensating capacitors each connected in series with one of said semiconductor switches, a detecting circuit for detecting the voltage and current components of electrical variations on the power line caused by the flicker generating load, the output of said current component detecting means being divided into two parts, a rectifier for receiving one of said output parts, a resistor connected to said rectifier for converting the rectified output into a voltage, a first transistor being connected in parallel with said resistor, a second transistor for receiving and being activated by the voltage component of said detecting circuit through an AND circuit and an OR circuit each being coupled to the outputs of said first and second transistors, resistor means coupled to said current component detecting means for developing a signal whos value corresponds to the electrical variation in the power line, a selecting circuit for receiving the output of said resistor means for generating a signal proportional to the amount of electrical variation in the power line, an inrush current preventing circuit for controlling the time at which said semiconductor switches are rendered conductive to prevent inrush current at the time the semiconductor switches connect their compensating capacitors from flowing into the capacitors to the power line, a second AND circuit for generating a signal when the output signal from the selecting circuit and the output signal from the inrush current preventing circuit are received simultaneously by said second AND circuit, a gate circuit for receiving the output signal of said second AND circuit to thereby issue a trigger signal to the required number of the semiconductor switches, whereby the semiconductor switches conduct and connect the required number of the compensating capacitors to the power line, and the flicker is thereby eliminated.

References Cited

UNITED STATES PATENTS

| | | | |
|---|---|---|---|
| 3,391,329 | 7/1968 | Meyer | 323—128 X |
| 3,449,653 | 6/1969 | Koppelmann | 318—230 X |
| 3,450,983 | 6/1969 | Koppelmann et al. | 323—128 X |

J. D. MILLER, Primary Examiner

G. GOLDBERG, Assistant Examiner

U.S. Cl. X.R.

219—110; 307—108, 297; 318—200; 323—122, 128